(No Model.)
W. F. SMITH.
SECONDARY BATTERY.
No. 415,981. Patented Nov. 26, 1889.
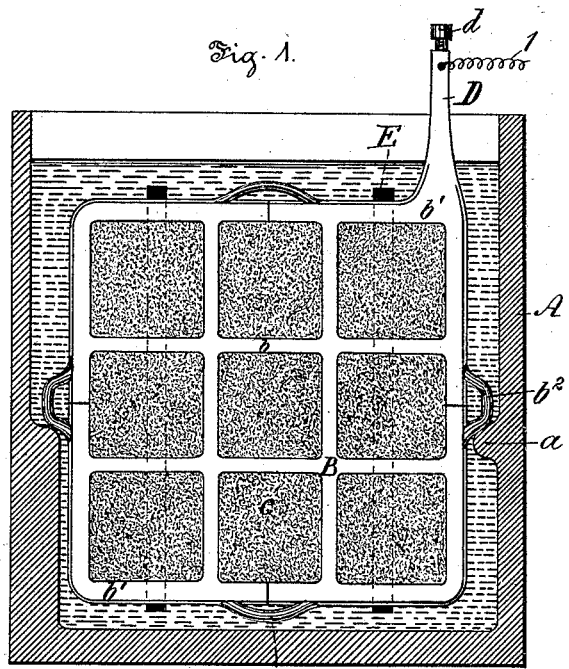
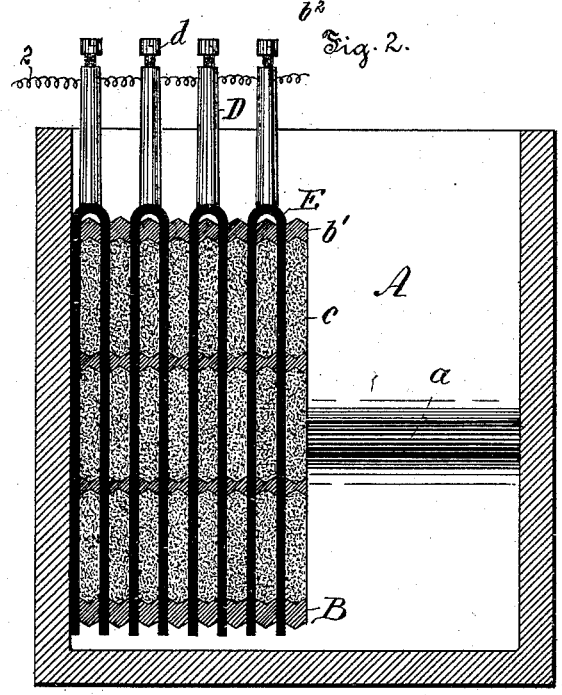
Witnesses:
Hermann Bormann
Thomas M. Smith
Inventor:
Walter F. Smith,
by J. Walter Douglass.
Atty.

UNITED STATES PATENT OFFICE.

WALTER F. SMITH, OF PHILADELPHIA, PENNSYLVANIA.

SECONDARY BATTERY.

SPECIFICATION forming part of Letters Patent No. 415,981, dated November 26, 1889.

Application filed September 10, 1889. Serial No. 323,510. (No model.)

*To all whom it may concern:*

Be it known that I, WALTER F. SMITH, a citizen of the United States, residing at the city of Philadelphia, in the county of Philadelphia and State of Pennsylvania, have invented certain new and useful Improvements in Secondary or Storage Batteries, of which the following is a specification.

My invention relates to the frames which surround the edges of and support the plates or elements of a secondary or storage battery.

A plate to form an element of a secondary or storage battery having as its principal constituent a salt of a metal, as chloride of lead, is difficult to cast solid, owing to the fact that such material contracts considerably, thereby leaving hollow spaces within the body of the plate, and air-bubbles are apt to form in the casting thereof, both of which greatly impair the utility of the plate for subsequent use as the element of an electric battery. Heretofore it has been customary to cast with or secure to the supporting-frames of the plates to form the elements of a battery lugs to which wires were attached for the passage of the current from a suitable source of electricity to the elements of the battery. The salts of many of the metals, when reduced to a metallic state, which are highly desirable for use as the elements of a secondary or storage battery, are poor conductors of electricity, as well as more or less fragile when cast into structures, and hence it has been found not only extremely difficult, but almost impossible, to obtain a good electrical contact through the wires and lugs with the active material of the plate, or the material to become active to form an element of a battery; and, furthermore, it has been found difficult to guard against undue expansion and contraction of the plates in forming and to avoid breaking and bulging and distortion of the supporting-frames thereof.

The principal objects of my invention are, first, to provide a supporting-frame for a battery plate or element to compensate for expansion or contraction and to obviate bending, buckling, bulging, and warping of the plate both during forming and use as the element of a battery; second, to provide a supporting-frame for a battery-plate to serve as an efficient and inexpensive means by which the plates or elements may be readily mounted and supported in a cell or removed therefrom without danger of breaking or cracking the plates or elements, and, third, to provide a supporting-frame for a battery plate or element in which the usual expansion or contraction which always occurs in the forming of the plate and in its use as an element of a battery is fully compensated for and the danger of the plates warping or bulging guarded against most satisfactorily.

The nature and characteristic features of my invention will be more particularly understood taken in connection with the accompanying drawings, forming part hereof, and in which—

Figure 1 is a vertical transverse section through a cell with an internal lateral bead or rim and a plate with a surrounding frame of the type embodying the features of my invention immersed in a fluid in the cell and supported by the rim or bead thereof; and Fig. 2 is a vertical longitudinal section through a cell having a series of plates mounted and supported therein, and said plates provided with supporting-frames embodying the features of my invention, with lugs or terminal connections.

In the drawings, the cell A, provided with an internal projecting lateral rim or bead $a$, is made of glass, wood, or other preferred material and adapted to contain an exciting-liquid or electrolyte. A frame B, with or without transverse strips $b$, is cast to, between, and around the edges of each plate $c$, constituting the element of the battery. The peripheral portion of the frame B is divided into two or more parts $b'$. Loops or compensating pieces $b^2$ are attached to or cast with said frame for uniting the two or more peripheral sections or segments thereof.

D is a lug provided with a binding-screw or other terminal device $d$, secured to or formed integral with said frame.

E are inverted-U-shaped devices, made of any preferred material, for insulating the respective plates or elements $c$ from each other.

1 and 2 are the wires or other suitable conductors coupling the plates with each other and with a generator or other source of electric energy. One or more plates or elements $c$, provided with frames B, are immersed in a liquid or fluid in a cell A and supported by means of the loops or compensating pieces $b^2$ in contact with the lateral rim or bead $a$ of the cell A. The plates surrounded and supported by the frame B may be reduced to a metal state for use as the elements of a battery by electrolysis in any preferred manner. When electrolysis is resorted to for the formation of the plates provided with a frame B, expansion and contraction, which always occurs, is freely permitted with the loops $b^2$ compensating therefor. At the same time the loops $b^2$ serve to maintain the frame B sufficiently rigid to properly retain the series of small plates composing the battery element in their relative positions to each other for use. Then these loops serve as supports to hold the plates or elements in position in the cell A. It will also be obvious that the frame B, arranged as described, will also permit the series of plates or elements to expand freely while mounted in battery in the cell A immersed in a suitable electrolyte for giving off electrical energy.

Having thus described the nature and objects of my invention, what I claim as new, and desire to secure by Letters Patent, is—

1. A battery plate or element provided with a divided supporting-frame having loops which connect the sections or segments of said frame with each other, substantially as and for the purposes set forth.

2. A battery element composed of a series of plates provided with vertical and transverse strips and a peripheral divided rim the sections of which are joined together by loops, substantially as and for the purposes set forth.

3. The combination of a cell provided with an internal bead or rim, an electrolyte, and two systems of plates or elements with supporting-frames having divided peripheral rims connected together by loops, substantially as and for the purposes set forth.

4. In combination, a battery element composed of a series of small plates supported by a frame with a sectional or segmental rim and loops uniting the sections or segments of said rim, substantially as and for the purposes set forth.

5. In combination, two systems of battery elements provided with sectional rims, loops uniting the sections of said rims with each other, a cell with a bead or rim, and a fluid, substantially as and for the purposes set forth.

In witness whereof I have hereunto set my signature in the presence of two subscribing witnesses.

WALTER F. SMITH.

Witnesses:
GEO. W. REED,
HERMANN BORMANN.